UNITED STATES PATENT OFFICE.

HERMANN GUTZKOW AND BENNO HOMOLKA, OF FRANKFORT-ON-THE-MAIN, GERMANY, ASSIGNORS TO THE FARBWERKE, VORMALS MEISTER, LUCIUS & BRÜNING, OF HÖCHST-ON-THE-MAIN, GERMANY.

PROCESS OF TRANSFORMING CARBON DYES.

SPECIFICATION forming part of Letters Patent No. 661,800, dated November 13, 1900.

Application filed February 15, 1900. Serial No. 5,300. (Specimens.)

*To all whom it may concern:*

Be it known that we, HERMANN GUTZKOW, a citizen of the Empire of Germany, and BENNO HOMOLKA, Ph. D., a citizen of the Empire of Austria-Hungary, both residing in Frankfort-on-the-Main, Germany, have invented certain new and useful Improvements in the Manufacture of Transformation Products of Coal-Tar Colors, of which the following is a specification.

We have found that those aromatic bases which contain in the molecule once or more the bivalent group $-NH-CH_2-$ or $-NR-CH_2$ (wherein R means alkyl) linked on both sides to benzene (toluene or xylene) act in a peculiar manner upon a great number of coal-tar dyestuffs which contain primary or secondary amido or hydroxyl groups. As bases of this kind we have recognized: I. Ortho-amidobenzylanilin, para-amidobenzylanilin, and their homologues and nitrogen-alkylated derivatives; II. Anhydro-para-amidobenzyl alcohol and its homologues and nitrogen-alkylated derivatives. The transformations of the dyestuffs produced by the said bases are of different kinds. In the first place they are affected by the class of dyestuffs to be employed, and in the second place they depend upon the choice of the transforming base. The basic dyestuffs soluble in water of the diamidotriphenylmethane, triamidotriphenylmethane, safranin, and rhodamin groups are transformed by the action of said bases into new products, likewise soluble in water, which differ greatly in shade from the original dyestuffs. Thus, for instance, from the bases of groups I and II from the diamidotriphenylcarbinol (called "benzal violet" or "Döbner's violet") blue to blue-green, from fuchsin violet, and from safranin and rhodamin 6G red-violet dyestuffs are obtained. The transformation, however, shows itself in quite a different manner with the dyestuffs of the fluorescin group and with certain azo dyestuffs, the so-called "congo" colors. In the case of these two groups of dyestuffs the transformation of the shade produced by the action of the bases mentioned at the beginning is more or less important, but that of other properties very efficacious. The dyestuffs of these two groups are transformed by the action of said bases into products insoluble or almost insoluble in water, which, as far as they are derived from congo colors, possess no longer or only slightly the great sensibility of the latter to acids. From this it follows that the dyes obtained with the transformed dyestuffs of the last two groups are much faster to water and when employing congo colors remarkably faster to acids in general.

The practical application of our method is very simple. It consists in treating the dyestuff to be transformed with the aqueous solution of any salt (hydrochlorid, sulfate, &c.) of any of the said bases at a moderately-elevated temperature. (With some dyestuffs the transformation takes place when left standing more or less at indoor temperature.)

The following examples will illustrate the process:

*Example I—Benzal violet (Döbner's violet).*—Thirty-two parts by weight of benzal violet are dissolved in water, to which is added the aqueous solution of a salt of one of the said bases—for instance, fifty parts of the hydrochlorid of ortho-amido-meta-xylyl-para-toluidin or the equivalent quantity of the hydrochlorid of para-amidobenzylanilin or the hydrochlorid of monomethyl-para-amidobenzyl alcohol, &c. On allowing the whole to stand for a little while at indoor temperature or on heating it for a little time to from 60° to 70° the violet color of the solution becomes a beautiful green-blue. The dyestuff is then salted, filtered, pressed, and dried. Thus a brown-violet powder of metallic luster is obtained, soluble in water and alcohol with a green-blue color. Most of the dyestuffs transformed by the above-mentioned bases exhibit a characteristic behavior toward nitrous acid. In a similar way does the dyestuff just described. If its alcoholic solution, slightly acidified, be treated with sodium nitrite, then the solution becomes green, while a similarly-treated solution of benzal violet dyes, as is known, slightly yellow. The products of transformation of the benzal violet thus obtained dye cotton mordanted with tannin blue to blue-green shades.

*Example II—Fuchsin.*—Thirty-seven parts of fuchsin treated with, for instance, forty-seven parts of the hydrochlorid of monomethyl-para-amidobenzyl alcohol in the manner described in Example I yield a dyestuff in form of a powder of bronze-like luster, which is soluble in water and alcohol with a violet color, dyeing cotton mordanted with tannin violet. Its alcoholic solution, slightly acidified, becomes blue when treated with nitrite. If, however, only sixteen parts of the above-mentioned hydrochlorid base be used with thirty-seven parts of fuchsin, then a product is obtained which is soluble in water with a redder less violet color. Rhodamin 6G is readily transformed into a blue-red dyestuff when treated with the salts of the above-named bases, even when allowed to stand at ordinary indoor temperature.

*Example III—Congo colors.*—As "congo" dyestuffs we understand here those substantive cotton dyestuffs which are obtained or supposed to be obtained by the action of tetrazodiphenyl, tetrazoditolyl, and similar tetrazo compounds with two nuclei upon aromatic amins, polyamins, phenols, polyphenols, and amidophenols of the anilin and naphthalene series, as well as their sulfonic and carboxylic acids. These dyestuffs are transformed, as already stated, by the action of the bases mentioned at the beginning into insoluble products of great value in the manufacture of lake colors and paper-printing. The following examples will illustrate both methods:

*Example 1—Congo red.*—Thirty-five parts of congo red are dissolved in three thousand five hundred parts water, to which are added 15.5 parts of the hydrochlorid of mono-methyl-para-amido-benzyl alcohol (obtained by the action of formaldehyde upon the hydrochlorid of monomethylanilin) dissolved in a little water. The mixture is then heated on the water-bath, when the new product separates as a red precipitate. It is then filtered, pressed, and dried.

*Example 2—Benzopurpurine 4B.*—Thirty-seven parts of benzopurpurine 4B are dissolved in about three thousand seven hundred parts of water, to which are added seventeen parts of the salt of the base obtained by the reciprocal action of molecular quantities of xylidin, formaldehyde, and hydrochloric acid. (It is quite immaterial which xylidin is chosen, it being best to use the technical xylidin, being, as is known, a mixture chiefly of as-m-xylidin, para-xylidin, and small quantities of other xylidins.) The whole is heated for a little while on the water-bath, and the precipitate thus obtained is then filtered, washed, and dried.

*Example 1—Diamin scarlet 3B.*—Thirteen parts of diamin scarlet 3B are dissolved in two thousand parts of water, to which is added the solution of a salt of one of the said bases— for instance, five parts of anhydro-para-amido-meta-tolylalcohol. The whole is heated for a short time at gentle water-bath temperature, when the product of reaction separates as a bluish-red precipitate hardly soluble in water. It is then filtered, pressed, and dried.

*Example IV—Fluorescin dyestuffs.*—What has been said concerning the congo colors holds good also with regard to the application of products obtained from the fluorescin dyestuffs by the action of the above-mentioned bases. The products, as already stated, are insoluble, and thus particularly suited for the production of lake colors. The process is illustrated by the following example:

*Example 3—Eosin.*—Twenty parts of eosin are dissolved in about one thousand parts of water, to which is added one of the bases mentioned at the beginning—such, for instance, as four parts of such a base as is obtained either by the reciprocal action of molecular quantities of formaldehyde and technical xylidin—that is to say, mixtures of isomeric ortho-para- and meta-xylidins—in presence of acids or by the transforming action of mineral acids upon anhydroformaldehyde-xylidin (obtained from the same technical mixture of the isomeric xylidins) in the form of a salt dissolved in water. The whole is then gently heated at water-bath temperature, when the new product separates as an ardent-red precipitate hardly soluble in water.

We have tested in a similar way a long series of coal-tar colors as to their behavior toward the bases mentioned at the beginning. In every case the above-cited fact was confirmed, that the choice of the transforming-base is almost immaterial upon the result obtained—that is to say, the results obtained with one and the same dyestuff and different bases do not differ much from each other.

Having now described our invention, what we claim as new, and desire to secure by Letters Patent, is—

The process herein described of producing transformation products of the coal-tar dyestuffs, which consists in treating the dye-stuffs with the salts soluble in water of aromatic bases which contain at least once in the molecule the bivalent group $-NH-CH_2-$ wherein the hydrogen atom of the group $-NH-$ may be substituted by alkyls, linked on both sides to aromatic carbon atoms, substantially as set forth.

In testimony that we claim the foregoing as our invention we have signed our names in presence of two subscribing witnesses.

HERMANN GUTZKOW.
BENNO HOMOLKA.

Witnesses:
HEINRICH HAHN,
ALFRED BRISBOIS.